United States Patent
Peng et al.

(10) Patent No.: US 12,552,712 B2
(45) Date of Patent: Feb. 17, 2026

(54) MODIFIED DOLOMITE POWDER, PREPARATION METHOD THEREOF AND CONCRETE

(71) Applicants: ANHUI ZHONGTIE ENGINEERING MATERIAL TECHNOLOGY CO., LTD., Anhui (CN); CHINA TIESIJU CIVIL ENGINEERING GROUP CO., LTD., Anhui (CN)

(72) Inventors: Jianwei Peng, Anhui (CN); Dongdong Fan, Anhui (CN); Hai Huang, Anhui (CN); Jie Tang, Anhui (CN); Chenghao Wu, Anhui (CN); Jianfeng Wen, Anhui (CN); Yucheng Tang, Anhui (CN); Chunsong Yu, Anhui (CN); Yitao Chen, Anhui (CN); Jianan Yao, Anhui (CN)

(73) Assignees: ANHUI ZHONGTIE ENGINEERING MATERIAL TECHNOLOGY CO., LTD., Anhui (CN); CHINA TIESIJU CIVIL ENGINEERING GROUP CO., LTD., Anhui (CN)

( * ) Notice: Subject to any disclaimer, the term of this patent is extended or adjusted under 35 U.S.C. 154(b) by 350 days.

(21) Appl. No.: 18/317,934

(22) Filed: May 16, 2023

(65) Prior Publication Data
US 2023/0382800 A1 Nov. 30, 2023

(30) Foreign Application Priority Data
May 26, 2022 (CN) .......................... 202210581327.7

(51) Int. Cl.
| C04B 28/10 | (2006.01) |
| C04B 22/14 | (2006.01) |
| C04B 22/16 | (2006.01) |
| C04B 40/00 | (2006.01) |

(52) U.S. Cl.
CPC .......... C04B 28/105 (2013.01); C04B 22/147 (2013.01); C04B 22/165 (2013.01); C04B 40/0032 (2013.01)

(58) Field of Classification Search
CPC ... C04B 28/105; C04B 22/147; C04B 22/165; C04B 40/0032; C04B 14/26; C04B 28/02; C04B 40/0042; C04B 28/00; C04B 20/023; C04B 2201/20; C04B 2201/50; C09C 1/02; C09C 3/063; Y02W 30/91
See application file for complete search history.

(56) References Cited

U.S. PATENT DOCUMENTS 3,960,580 A * 6/1976 Stierli ..................... C04B 28/34
106/690
2018/0078506 A1* 3/2018 Wagner-Hattler ... A61K 9/2068

FOREIGN PATENT DOCUMENTS

| BY | 13579 C1 * | 8/2010 | |
| CN | 103396026 | 11/2013 | |
| CN | 106747090 | 5/2017 | |
| CN | 108046621 | 5/2018 | |
| KR | 102058680 B1 * | 12/2019 | ............. C04B 24/26 |

OTHER PUBLICATIONS

Machine English translation of Chistova Tatyana Anatolyevna, BY-13579-C1, Aug. 30, 2010. (Year: 2010).*
Machine English translation of Kim Dong Jin, KR-102058680-B1, Dec. 23, 2019. (Year: 2019).*

* cited by examiner

*Primary Examiner* — Coris Fung
*Assistant Examiner* — Caroline D. Liott
(74) *Attorney, Agent, or Firm* — JCIPRNET

(57) ABSTRACT

The invention provides a modified dolomite powder, a preparation method thereof, and a concrete. The modified dolomite powder is prepared from 98% to 99% of a dolomite powder, 0.2% to 0.5% of a chaotropic agent, 0.6% to 1.0% of a dihydrogen phosphate, and 0.2% to 0.5% of a capillary filler according to the mass percentage. The chaotropic agent is one or more of sodium sulfate, potassium sulfate, and ammonium sulfate. By promoting the dissolution of the surface of the dolomite powder, participating in the hydration reaction, and filling capillary pores, the triple modification solves the problems of bleeding, strength, and durability of the dolomite powder concrete in the related art. The obtained modified dolomite powder has good solubility and high chemical activity, and the prepared concrete has high strength and compactness, low porosity, and good durability.

8 Claims, No Drawings

MODIFIED DOLOMITE POWDER, PREPARATION METHOD THEREOF AND CONCRETE

CROSS-REFERENCE TO RELATED APPLICATION

This application claims the priority benefit of China application serial no. 202210581327.7, filed on May 26, 2022. The entirety of the above-mentioned patent application is hereby incorporated by reference herein and made a part of this specification.

BACKGROUND

Technical Field

The disclosure relates to the field of building materials, and in particular, relates to a modified dolomite powder, a preparation method thereof, and a concrete containing the modified dolomite powder.

Description of Related Art

In recent years, with the rapid development of hydraulic engineering, transportation, and the construction of various civil facilities, the use of concrete is increasing day by day. At present, the most widely used mineral admixtures in concrete are fly ash and mineral powder. However, currently, the fly ash market in China has begun to face the problems of resource shortage and long transportation distances, and these problems considerably increase the manufacturing costs of concrete as well as the costs of engineering. Further, in the current fly ash market, prominent problems such as market chaos, unstable quality, shoddy products, and supply shortages have surfaced, and the supply and quality of concrete are significantly affected as a result. If mineral powder is used in large amounts to replace fly ash, it will cause a substantial increase in the costs of concrete production enterprises, and problems such as high viscosity and low construction efficiency may occur with the use of the prepared high-grade concrete. Therefore, a mineral admixture with wide resource distribution and stable performance is needed to replace fly ash.

In China, dolomite is one of the abundant mineral resources, and the mining volume of dolomite exceeds 10 million tons every year. However, during the crushing process of dolomite, a large amount of solid waste residue and waste powder will be produced. Therefore, if the waste residue and waste powder of dolomite are modified and used as a mineral admixture for concrete, such a modification and use are not only economical and practical but will also bring advantages such rich resources, low costs, and low energy consumption, so the market prospect is broad.

Studies have shown that dolomite powder mainly provides the function of micro-aggregate filling in the cementing material system and optimizes the microstructure to a certain extent. However, the application of dolomite powder in concrete has the following problems. 1) The solubility of dolomite powder in cement-based materials is extremely low, so it is difficult for dolomite powder to react chemically with cement, and since the chemical activity is obviously low, it is unfavorable for the strength of cement concrete. The strength of concrete decreases significantly with the increase of dolomite powder content. 2) The surface of dolomite powder is smooth, and the attached water film is thin and poor in water retention, so the prepared concrete is easy to segregate and bleed. 3) Considering the economics of technology, the modification costs of dolomite powder cannot make the price of dolomite powder higher than that of traditional mineral admixtures such as fly ash.

The Chinese patent with the publication number CN103396026A discloses a dolomite composite admixture preparation method for micro-expansion or compensation shrinkage concrete. The admixture is prepared by grinding dolomite to the same particle size as Portland cement and then mixing a certain amount of sodium oxide with an alkali-containing substance evenly. In this way, the impermeability and flexural strength of concrete mixed with stone powder are improved, but the compressive strength of concrete mixed with stone powder is not improved. Further, a higher content of alkali-containing substances may cause the concrete to return to alkali.

The Chinese patent with the publication number CN106747090A discloses a modified dolomite powder-based mineral admixture, which is uniformly prepared by mixing dolomite powder, mineral powder, fly ash, and bentonite. However, bentonite, which absorbs water and expands, will gradually lose water and shrink during the hardening process of concrete, and the shrinkage of concrete will increase. On the other hand, the prices of mineral powder and bentonite are much higher than that of dolomite powder, and the content of mineral powder and bentonite is high. Therefore, the cost performance of the modified dolomite powder-based mineral admixture is low, and its popularization and use are thus limited.

The Chinese patent with the publication number CN108046621A discloses a preparation method of calcined dolomite powder. In the method, the calcined dolomite powder has strong chemical activity and can be used as a main raw material for preparing magnesium phosphate cement and magnesium oxychloride cement. However, in this preparation method, the energy consumption is high, and the costs are obviously higher than the prices of fly ash and granulated blast furnace slag powder. If it is used as a mineral admixture for concrete, it is not economical and practical.

Therefore, in view of the cost performance of the modified dolomite powder and the problems of easy segregation and bleeding and low compressive strength faced by the dolomite powder concrete, it is necessary to develop a modified dolomite powder exhibiting high water retention, requiring a simple preparation process and low costs, and having non-toxic, harmless, and environmentally friendly raw materials.

SUMMARY

The disclosure provides a modified dolomite powder exhibiting improved surface roughness and hydrophilicity of the dolomite powder through physical and chemical double modification of the dolomite powder, and the dolomite powder has certain hydration activity.

To accomplish the foregoing purposes, the following technical solutions are adopted by the disclosure.

The disclosure provides a modified dolomite powder prepared from 98% to 99% of a dolomite powder, 0.2% to 0.5% of a chaotropic agent, 0.6% to 1.0% of a dihydrogen phosphate, and 0.2% to 0.5% of a capillary filler according to the mass percentage.

The chaotropic agent is one or more of sodium sulfate, potassium sulfate, and ammonium sulfate.

Further, a particle size of the dolomite powder is 300 mesh to 600 mesh.

In the disclosure, the preferred 300 mesh to 600 mesh dolomite powder has a smaller particle size than cement, which can increase the compactness of concrete on the one hand. On the other hand, the grinding costs of 300 mesh to 600 mesh are low, and the strength of the prepared concrete is high. Compared to finer or coarser dolomite powder, 300 mesh to 600 mesh dolomite powder is more cost-effective.

More preferably, the particle size of the dolomite powder is 600 mesh, so that the performance of the modified dolomite powder is the most favorable.

Further, the dihydrogen phosphate is one or more of ammonium dihydrogen phosphate, potassium dihydrogen phosphate, and sodium dihydrogen phosphate.

Further, the capillary filler is one or more of polyaluminum sulfate, polyferric sulfate, and polyaluminum-ferric sulfate.

Further, a mass ratio of the chaotropic agent, the dihydrogen phosphate, and the capillary filler is 2:6:2.

The chaotropic agent used in the disclosure is sodium sulfate, potassium sulfate, and ammonium sulfate. It is a chaotropic agent for dolomite powder and can ionize high concentration $SO_4^{2-}$ in water. $SO_4^{2-}$ can reduce the ion activity of $Ca^{2+}$, $Mg^{2+}$, and $CO_3^{2-}$ in dolomite and increase the ion concentration of $Ca^{2+}$, $Mg^{2+}$, and $CO_3^{2-}$ in water, so that the solubility of dolomite in water is in turn increased. The partial dissolution of the dolomite powder may gradually dissolve the very dense surface of the dolomite powder, and an uneven rough surface is formed. In this way, the adhesion of the water film on the surface of the dolomite powder is promoted, that is, the water retention of the dolomite powder is increased.

Further, $Ca^{2+}$ and $CO_3^{2-}$ can chemically react with tricalcium aluminate $C_3A$ ($3CaO \cdot Al_2O_3$) in cement, and $Mg^{2+}$ can chemically react with dihydrogen phosphate ($BH_2PO_4$), as follows:

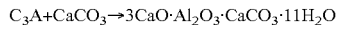

$$C_3A + CaCO_3 \rightarrow 3CaO \cdot Al_2O_3 \cdot CaCO_3 \cdot 11H_2O$$

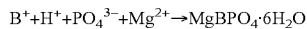

$$B^+ + H^+ + PO_4^{3-} + Mg^{2+} \rightarrow MgBPO_4 \cdot 6H_2O$$

The generated $3CaO \cdot Al_2O_3 \cdot CaCO_3 \cdot 11H_2O$ and $MgBPO_4 \cdot 6H_2O$ exhibit the following functions in concrete: First, a specific degree of cementing is provided, and the strength of the dolomite powder concrete is improved. Second, the pores in the concrete are filled to prevent the external erosive media from entering the interior of the concrete, so that the durability of the dolomite powder concrete is improved. Third, $3CaO \cdot Al_2O_3 \cdot CaCO_3 \cdot 11H_2O$ and $MgBPO_4 \cdot 6H_2O$ are precipitates, so the above chemical reaction formulas can continue to proceed, and the surface of the dolomite powder can also be continuously eroded.

The capillary filler such as polyaluminum sulfate, polyferric sulfate, and polyaluminum-ferric sulfate can react with hydration product in cement $Ca(OH)_2$ to generate water-insoluble $Al(OH)_3$ or $Fe(OH)_3$ colloids and can also interact with calcium aluminate hydrate in cement to generate ettringite crystals with certain expansibility. These colloids and crystals fill the capillary channels of the concrete, so that the resistance of preventing external erosive media from entering the interior of the concrete is improved, and that the durability of the dolomite powder concrete is enhanced. The capillary filler is an inorganic salt and is able to participate in cement hydration, so the strength of concrete is not be lowered.

Preferably, the mass ratio of the chaotropic agent for dolomite powder, dihydrogen phosphate, and capillary filler is 2:6:2, so that the performance of the modified dolomite powder is optimized.

The second purpose of the disclosure is to provide a preparation method of a modified dolomite powder, and the method includes the following steps.

(1) According to the proportioning ratios, dolomite powder, a chaotropic agent, dihydrogen phosphate, and a capillary filler are weighed.

(2) The chaotropic agent is dissolved in water into a chaotropic agent diluent.

(3) While stirring the dolomite powder, the chaotropic agent diluent is sprayed, so that the chaotropic agent is evenly dispersed among dolomite powder.

(4) The dihydrogen phosphate and the capillary filler are then added and fully mixed to obtain the modified dolomite powder.

Further, a mass concentration of the chaotropic agent diluent is 5% to 10%.

It can be understood that the mixing here is conventional mechanical mixing in the art. The mixing time is no longer specifically limited herein, as long as it can be mixed uniformly. In some embodiments of the disclosure, the preferred mixing time is 10 min.

The third purpose of the disclosure is to provide a concrete containing the abovementioned modified dolomite powder. An added amount of the modified dolomite powder is 15% to 30% of a cementing material.

Compared to the related art, the beneficial effects of the disclosure include the following.

In the disclosure, the use of the chemical modifier mixed with the chaotropic agent for dolomite powder, dihydrogen phosphate, and capillary filler promotes the dissolution of the dolomite powder and chemically reacts with dihydrogen phosphate and cement clinker $C_3A$. In this way, the chemical activity and water retention of the dolomite powder at room temperature are improved, and the porosity of the concrete is reduced. The strength and compactness of the concrete are thereby improved, so that the strength and durability of the dolomite powder concrete are comparable to those of the conventional fly ash concrete, and the application of the dolomite powder in concrete is considerably promoted. In this way, a new alternative is provided to solve the problem of shortage of high-quality fly ash in the market.

DESCRIPTION OF THE EMBODIMENTS

In order to facilitate understanding of the disclosure, the disclosure will be described more comprehensively below together with specific embodiments. However, the disclosure can be implemented in many different forms and is not limited to the embodiments described herein. On the contrary, the purpose of providing these embodiments is to make the disclosed content of the disclosure more thorough and comprehensive.

Unless otherwise defined, all technical and scientific terms used herein have the same meaning as commonly understood by a person having ordinary skill in the art to which this disclosure belongs. The terms used herein in the description of the disclosure are for the purpose of describing specific embodiments only, and are not intended to limit the disclosure.

A preparation method of modified dolomite powder in the following examples and comparative examples is provided as follows:

(1) According to the proportioning ratios in Table 1 below, dolomite powder, a chaotropic agent, dihydrogen phosphate, and a capillary filler are weighed.

(2) The chaotropic agent is dissolved in water into a chaotropic agent diluent with a mass concentration of 5% to 10%.

(3) While stirring the dolomite powder, the chaotropic agent diluent is sprayed, so that the chaotropic agent is evenly dispersed among dolomite powder.

(4) The dihydrogen phosphate and the capillary filler are then added and fully mixed to obtain the modified dolomite powder.

Class II fly ash is used as Comparative Example 1.

TABLE 1

Raw material components and proportioning ratios of modified dolomite powder in Examples 1 to 6 and Comparative Examples 1 to 5

| No. | Dolomite Powder | | | | Class II Fly Ash | Chao-tropic Agent | Dihydrogen Phosphate | Capillary Filler |
| --- | --- | --- | --- | --- | --- | --- | --- | --- |
| | 600 mesh | 500 mesh | 400 mesh | 300 mesh | | | | |
| Comparative Example 1 | — | — | — | — | 100% | — | — | — |
| Comparative Example 2 | 100% | — | — | — | — | — | — | — |
| Comparative Example 3 | 99% | — | — | — | — | 1% | — | — |
| Comparative Example 4 | 97% | — | — | — | — | — | 3% | — |
| Comparative Example 5 | 99% | — | — | — | — | — | — | 1% |
| Example 1 | 98% | — | — | — | — | 0.5% | 1.0% | 0.5% |
| Example 2 | 98.5% | — | — | — | — | 0.3% | 0.9% | 0.3% |
| Example 3 | 99% | — | — | — | — | 0.2% | 0.6% | 0.2% |
| Example 4 | — | 99% | — | — | — | 0.2% | 0.6% | 0.2% |
| Example 5 | — | — | 99% | — | — | 0.2% | 0.6% | 0.2% |
| Example 6 | — | — | — | 99% | — | 0.2% | 0.6% | 0.2% |

The components and proportioning ratios of the concrete are listed in Table 2.

TABLE 2

Mixing ratios of concrete components (in kg)

| No. | Portland Cement | Modified Dolomite Powder | Class II Fly Ash | Medium Coarse River Sand | Stones with Particle Size of 5 to 31.5 mm | Water-reducing Admixture | Water |
| --- | --- | --- | --- | --- | --- | --- | --- |
| Mix Ratio 1 | 359 | — | 79 | 747 | 1032 | 4.35 | 162 |
| Mix Ratio 2 | 372 | 66 | — | 747 | 1032 | 4.35 | 162 |
| Mix Ratio 3 | 359 | 79 | — | 747 | 1032 | 4.35 | 162 |
| Mix Ratio 4 | 329 | 109 | — | 747 | 1032 | 4.35 | 162 |
| Mix Ratio 5 | 307 | 131 | — | 747 | 1032 | 4.35 | 162 |

The concrete obtained above is tested according to GB/T 50082-2009 "Standard for test methods of long-term performance and durability of ordinary concrete" for the working performance, mechanical performance, and durability performance of each group of concrete specimens.

The composition of the Class II fly ash in Mix Ratio 1 is Comparative Example 1 in Table 1, the composition of the modified dolomite powder in Mix Ratio 3 is Examples 1 to 6 and Comparative Examples 2 to 5 in Table 1, and the performance test results are shown in Table 3.

TABLE 3

Concrete performance test results

| No. | II Class Fly Ash or Modified Dolomite Powder | Normal Pressure Bleeding Rate (%) | 28d Compressive Strength (MPa) | Electric Flux (C) |
| --- | --- | --- | --- | --- |
| Concrete 1 | Comparative Example 1 | 0 | 46 | 1469 |
| Concrete 2 | Comparative Example 2 | 32 | 33.7 | 875 |
| Concrete 3 | Comparative Example 3 | 10 | 37.5 | 903 |
| Concrete 4 | Comparative Example 4 | 29 | 39.9 | 1026 |
| Concrete 5 | Comparative Example 5 | 22 | 36.8 | 960 |
| Concrete 6 | Example 1 | 0 | 42.3 | 1347 |
| Concrete 7 | Example 2 | 0 | 43.8 | 1432 |
| Concrete 8 | Example 3 | 0 | 45.6 | 1458 |
| Concrete 9 | Example 4 | 0 | 43.1 | 1335 |
| Concrete 10 | Example 5 | 0 | 42.5 | 1289 |
| Concrete 11 | Example 6 | 0 | 41.2 | 1246 |

The modified dolomite powder prepared in Example 3 is prepared according to the Mix Ratios of 2 to 5 in Table 2, and the performance test results are shown in Table 4.

TABLE 4

Performance test results of the concrete prepared from the modified dolomite powder in Example 3

| No. | Formulation | Normal Pressure Bleeding Rate (%) | 28d Compressive Strength (MPa) | Electric Flux (C) |
|---|---|---|---|---|
| Concrete 12 | Mix Ratio 2 | 0 | 47.2 | 1433 |
| Concrete 13 | Mix Ratio 3 | 0 | 45.6 | 1458 |
| Concrete 14 | Mix Ratio 4 | 0 | 42.0 | 1367 |
| Concrete 15 | Mix Ratio 5 | 0 | 40.9 | 1312 |

According to the test results in Table 3 and Table 4, it can be seen that the normal pressure bleeding rate of Concrete 2 prepared from the dolomite powder alone is 32%, which is higher than the specification requirement, and the 28d compressive strength and electric flux are also obviously low. With the addition of the modified dolomite powder, the performance indexes of the concrete are significantly optimized. Herein, the performance indexes of Concrete 6 to Concrete 8 made by adding the modified dolomite powder made of 600-mesh dolomite powder are basically comparable to those of Concrete 1 mixed with Class II fly ash alone. Further, the working performance, mechanical performance, and durability performance of Concrete 6 to Concrete 8 are good. Therefore, the modified dolomite powder in the disclosure can be used to replace Class II fly ash as a raw material for concrete. The costs of the chaotropic agent, dihydrogen phosphate, and capillary filler are low and the production process is simple, so the total costs of the modified dolomite powder are lower than the price of Class II fly ash. As such, the production costs of concrete can be greatly reduced, and comparable performance is provided.

In contrast, the performance of the obtained Concrete 3 to Concrete 5 prepared from the dolomite powder modified by a single modifier in Comparative Example 3 to Comparative Example 5 is obviously worse than that of the Concrete 6 to Concrete 8. Therefore, the modification of the dolomite powder by the chaotropic agent, dihydrogen phosphate, and capillary filler can significantly improve the working performance, mechanical performance, and durability of the concrete.

The technical features of the above-described embodiments may be combined arbitrarily. In order to simplify the description, not all possible combinations of the technical features in the above embodiments are described. However, as long as there is no contradiction in the combinations of these technical features, these combinations should be considered to be within the scope of the description in this specification.

The abovementioned embodiments only represent several embodiments of the disclosure, and the descriptions thereof are specific and detailed, but should not be construed as a limitation on the scope of the invention patent. It should be pointed out that for a person having ordinary skill in the art, without departing from the concept of the disclosure, several modifications and improvements can be made, which all belong to the protection scope of the disclosure. Therefore, the protection scope of the patent of the disclosure should be subject to the appended claims.

What is claimed is:

1. A modified dolomite powder, prepared from 98% to 99% of a dolomite powder, 0.2% to 0.5% of a chaotropic agent, 0.6% to 1.0% of a dihydrogen phosphate, and 0.2% to 0.5% of a capillary filler according to the mass percentage,
   wherein the chaotropic agent is one or more of sodium sulfate, potassium sulfate, and ammonium sulfate.

2. The modified dolomite powder according to claim 1, wherein a particle size of the dolomite powder is 300 mesh to 600 mesh.

3. The modified dolomite powder according to claim 2, wherein the particle size of the dolomite powder is 600 mesh.

4. The modified dolomite powder according to claim 1, wherein the dihydrogen phosphate is one or more of ammonium dihydrogen phosphate, potassium dihydrogen phosphate, and sodium dihydrogen phosphate.

5. The modified dolomite powder according to claim 1, wherein the capillary filler is one or more of polyaluminum sulfate, polyferric sulfate, and polyaluminum-ferric sulfate.

6. The modified dolomite powder according to claim 1, wherein a mass ratio of the chaotropic agent, the dihydrogen phosphate, and the capillary filler is 2:6:2.

7. A preparation method of the modified dolomite powder according to claim 1, comprising:
   (1) weighing 98% to 99% of the dolomite powder, 0.2% to 0.5% of the chaotropic agent, 0.6% to 1.0% of the dihydrogen phosphate, and 0.2% to 0.5% of the capillary filler according to the mass percentage;
   (2) dissolving the chaotropic agent in water into a chaotropic agent diluent;
   (3) spraying the chaotropic agent diluent while stirring the dolomite powder, so that the chaotropic agent is evenly dispersed among the dolomite powder; and
   (4) adding the dihydrogen phosphate and the capillary filler, and mixing thoroughly to obtain the modified dolomite powder.

8. A concrete, comprising the modified dolomite powder according to claim 1, wherein an added amount of the modified dolomite powder is 15% to 30% of a cementing material.

* * * * *